(12) United States Patent
Bauman et al.

(10) Patent No.: US 7,778,604 B2
(45) Date of Patent: Aug. 17, 2010

(54) GARAGE DOOR OPENER COMMUNICATIONS GATEWAY MODULE FOR ENABLING COMMUNICATIONS AMONG VEHICLES, HOUSE DEVICES, AND TELECOMMUNICATIONS NETWORKS

(75) Inventors: Jason G. Bauman, Huntington Woods, MI (US); Jody K. Harwood, Canton, MI (US); Kenan R. Rudnick, Bloomfield Hills, MI (US)

(73) Assignee: Lear Corporation, Southfield, MI (US)

( * ) Notice: Subject to any disclaimer, the term of this patent is extended or adjusted under 35 U.S.C. 154(b) by 733 days.

(21) Appl. No.: 11/690,380

(22) Filed: Mar. 23, 2007

(65) Prior Publication Data

US 2007/0167138 A1 Jul. 19, 2007

Related U.S. Application Data

(63) Continuation-in-part of application No. 10/768,505, filed on Jan. 30, 2004, now Pat. No. 7,197,278.

(51) Int. Cl.
*H04B 7/00* (2006.01)

(52) U.S. Cl. ............... 455/41.2; 455/66.1; 455/344; 455/345; 455/423; 455/569.1; 340/5.61; 340/5.71

(58) Field of Classification Search ........... 455/41.2, 455/66.1, 344, 345, 423, 569.1; 340/5.61, 340/5.71
See application file for complete search history.

(56) References Cited

U.S. PATENT DOCUMENTS

| | | | |
|---|---|---|---|
| 4,961,212 A | 10/1990 | Marui et al. | |
| 5,353,376 A | 10/1994 | Oh et al. | |
| 5,864,603 A | 1/1999 | Haavisto et al. | |
| 6,041,300 A | 3/2000 | Ittycheriah et al. | |
| 6,131,044 A | 10/2000 | Ryu | |
| 6,167,251 A | 12/2000 | Segal et al. | |
| 6,212,408 B1 | 4/2001 | Son et al. | |
| 6,240,303 B1 | 5/2001 | Katzur | |
| 6,366,649 B1 | 4/2002 | Chun et al. | |
| 6,389,337 B1* | 5/2002 | Kolls | 701/29 |
| 6,449,496 B1 | 9/2002 | Beith et al. | |
| 6,505,159 B1 | 1/2003 | Theodore | |
| 7,135,957 B2 | 11/2006 | Wilson | |
| 7,167,076 B2 | 1/2007 | Wilson | |
| 7,349,722 B2* | 3/2008 | Witkowski et al. | 455/569.2 |
| 2001/0000505 A1 | 4/2001 | Segal et al. | |
| 2002/0146999 A1* | 10/2002 | Witte | 455/345 |
| 2003/0032460 A1 | 2/2003 | Cannon et al. | |

(Continued)

*Primary Examiner*—Sanh D Phu
(74) *Attorney, Agent, or Firm*—Brooks Kushman P.C.

(57) ABSTRACT

A garage door opener (GDO) communications gateway module includes a receiver for receiving garage door signals and a transmitter for transmitting control signals to a GDO operable for opening and closing a garage door of a garage of a house. The transmitter transmits a control signal to the GDO to control the garage door upon receipt of a garage door signal by the receiver. The module includes a Bluetooth enabled first transceiver for communicating with a Bluetooth enabled appliance of a vehicle over a wireless communications path when the vehicle is located within the vicinity of the garage. The module includes a second transceiver for communicating with a device of the house over another communications path. The vehicle appliance and the house device communicate with one another over the communications paths via the transceivers. The receiver, the transmitter, and the transceivers are contained within a housing mountable to the garage.

19 Claims, 2 Drawing Sheets

U.S. PATENT DOCUMENTS

| | | |
|---|---|---|
| 2003/0040903 A1 | 2/2003 | Gerson |
| 2003/0064755 A1 | 4/2003 | Piwowarski |
| 2003/0083113 A1 | 5/2003 | Chua et al. |
| 2003/0101052 A1 | 5/2003 | Chen et al. |
| 2003/0114202 A1 | 6/2003 | Suh et al. |
| 2003/0135371 A1 | 7/2003 | Chang et al. |
| 2004/0110472 A1* | 6/2004 | Witkowski et al. ......... 455/41.2 |
| 2005/0128068 A1 | 6/2005 | Winick et al. |
| 2005/0170777 A1 | 8/2005 | Harwood et al. |
| 2006/0187034 A1 | 8/2006 | Styers et al. |

* cited by examiner

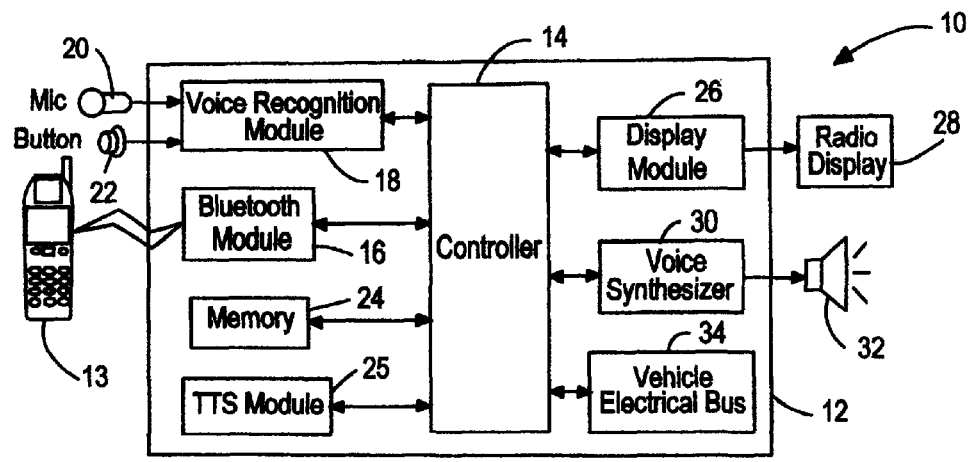
FIG. 1
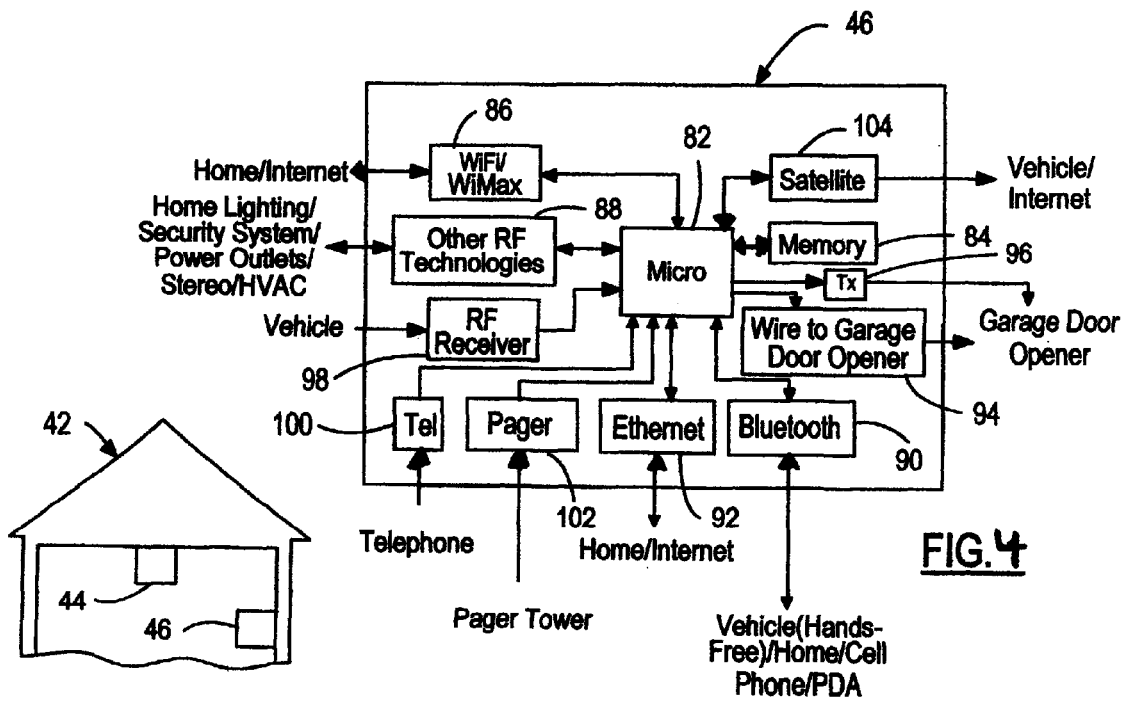
FIG. 2
FIG. 4

GARAGE DOOR OPENER COMMUNICATIONS GATEWAY MODULE FOR ENABLING COMMUNICATIONS AMONG VEHICLES, HOUSE DEVICES, AND TELECOMMUNICATIONS NETWORKS

CROSS-REFERENCE TO RELATED APPLICATIONS

This application is a continuation-in-part of U.S. application Ser. No. 10/768,505, filed Jan. 30, 2004, now U.S. Pat. No. 7,197,278, which is hereby incorporated by reference in its entirety.

BACKGROUND OF THE INVENTION

1. Field of the Invention

The present invention relates to garage door opener systems.

2. Background Art

Garage door opener systems include a portable transmitter and a garage door opener (GDO). The GDO is mounted in a garage. The GDO includes a controller for actuating a mechanical device to open or close the garage door. The GDO includes a receiver for wirelessly receiving signals. In operation, a user activates the transmitter to open or close the garage door. In turn, the transmitter wirelessly transmits a garage door signal recognized by the GDO receiver. Upon the GDO receiver receiving the garage door signal, the GDO controller actuates the mechanical device to open or close the garage door.

Some vehicles include integrated vehicle transceivers for controlling a GDO. A vehicle transceiver learns the garage door signal recognized by the GDO receiver. Typically, the learning process includes placing the transceiver into a programming mode and using the portable transmitter to transmit the garage door signal to the transceiver. The transceiver learns the received garage door signal as being the garage door signal recognized by the GDO receiver. In operation, a user activates the transceiver which in turn wirelessly transmits the garage door signal recognized by the GDO receiver to open or close the garage door. A problem with such transceivers is programming difficulty encountered by users.

Some vehicles include hands-free telephone systems. A hands-free telephone system enables a user to talk on a cell phone while using both hands for driving the vehicle. Some hands-free telephone systems use a voice recognition module (VRM) which enables the user to answer and make cell phone calls and re-dial numbers using voice commands. Some hands-free telephone systems use a Bluetooth communications module for wirelessly communicating with a Bluetooth enabled cell phone in the vehicle. During a call between a user using the cell phone and another party over a telecommunications network, the communications module receives the voice signals from the user via a microphone and wirelessly communicates the voice signals to the cell phone for transmission over the telecommunications network for receipt by the other party. Likewise, during the call, the communications module wirelessly receives the voice signals from the other party from the cell phone and outputs the voice signals of the other party through the vehicle speakers for the user to hear. The communications module can communicate with any Bluetooth enabled device in the vicinity of the vehicle even if the device is external to the vehicle.

It would be desirable for a GDO receiver and a Bluetooth enabled communications module of a vehicle to communicate with one another such that the GDO receiver functions as a communications gateway module for enabling communications among the vehicle, devices of the house of the garage, and telecommunications networks.

SUMMARY OF THE INVENTION

An object of the present invention is a garage door opener (GDO) communications gateway module for a garage of a house in which the module enables communications among vehicles, house devices, and telecommunications networks.

Another object of the present invention is a GDO communications gateway module for a garage of a house in which the module enables communications among a vehicle, house devices, and a telecommunications network and enables the garage door to be controlled via communications from a transmitter in the vehicle.

A further object of the present invention is a GDO communications gateway module for a garage of a house in which the module enables communications among a vehicle, house devices, and a telecommunications network and enables the garage door to be controlled via communications from a telecommunications device connected to the telecommunications network.

Another object of the present invention is a method and system having a GDO communications gateway module for a garage of a house in which the module enables communications between a vehicle and house devices.

A further object of the present invention is a method and system having a GDO communications gateway module for a garage of a house in which the module enables communications between house devices and a telecommunications network.

Another object of the present invention is a method and system having a GDO communications gateway module for a garage of a house in which the module enables communications between a vehicle and a telecommunications network.

A further object of the present invention is a method and system having a GDO communications gateway module for a garage of a house in which the module enables communications between a Bluetooth enabled device of a vehicle and house devices.

Another object of the present invention is a method and system having a GDO communications gateway module for a garage of a house in which the module enables communications between a Bluetooth enabled hands-free telephone system of a vehicle and house devices.

A further object of the present invention is a method and system having a GDO communications gateway module for a garage of a house in which the module enables communications between a vehicle and Bluetooth enabled house devices.

Another object of the present invention is a method and system having a GDO communications gateway module for a garage of a house in which the module enables communications between Bluetooth enabled house devices and telecommunications networks.

A further object of the present invention is a method and system having a GDO communications gateway module for a garage of a house in which the module enables communications between a vehicle and at least one of a personal computer, a security device, and a lighting device of the house.

Another object of the present invention is a method and system having a GDO communications gateway module for a garage of a house in which the module enables communications between a telecommunications device connected to a telecommunications network and at least one of a personal computer, a security device, and a lighting device of the house.

A further object of the present invention is a method and system having a GDO communications gateway module for a garage of a house in which the module enables communications between a vehicle and the Internet via a personal computer of the house.

Another object of the present invention is a method and system having a GDO communications gateway module for a garage of a house in which the module enables communications between a personal computer connected to the Internet and a house device.

In carrying out the above objects and other objects, the present invention provides a garage door opener (GDO) communications gateway module. The module includes a garage door receiver for receiving garage door signals. The module includes a garage door transmitter for transmitting control signals to a GDO operable for opening and closing a garage door of a garage of a house. The garage door transmitter transmits a control signal to the GDO to control the garage door upon receipt of a garage door signal by the garage door receiver. The module includes a first transceiver. The first transceiver is Bluetooth enabled for wirelessly communicating with a Bluetooth enabled appliance of a vehicle over a first communications path when the vehicle is located within the vicinity of the garage. The module includes a second transceiver for communicating with a device of the house over a second communications path. The vehicle appliance and the house device communicate with one another over the first and second communications paths via the first and second transceivers. The garage door receiver, the garage door transmitter, and the first and second transceivers are contained within a housing mountable to the garage.

Further, in carrying out the above objects and other objects, the present invention provides another garage door opener communications gateway module. This module includes a garage door receiver for receiving garage door signals and a garage door transmitter for transmitting control signals to a garage door opener operable for opening and closing a garage door of a garage of a house. The garage door transmitter transmits a control signal to the garage door opener to control the garage door upon receipt of a garage door signal by the garage door receiver. The module further includes a telecommunications receiver for receiving telecommunications signals from a telecommunications network. The garage door transmitter transmits a control signal to the garage door opener to control the garage door upon receipt by the telecommunications receiver of a telecommunications signal containing information indicative of the garage door signal. The garage door receiver, the garage door transmitter, and the telecommunications receiver are contained within a housing mountable to the garage.

The above features, and other features and advantages of the present invention are readily apparent from the following detailed descriptions thereof when taken in connection with the accompanying drawings.

BRIEF DESCRIPTION OF THE DRAWINGS

FIG. 1 illustrates a block diagram of a hands-free telephone system of a vehicle in accordance with an embodiment of the present invention;

FIG. 2 illustrates a block diagram of a garage of a house having a garage door opener (GDO) and a GDO communications gateway module in accordance with an embodiment of the present invention;

FIG. 4 illustrates a block diagram of the GDO communications gateway module in accordance with an embodiment of the present invention.

DETAILED DESCRIPTION OF THE PREFERRED EMBODIMENT(S)

Figure 3:
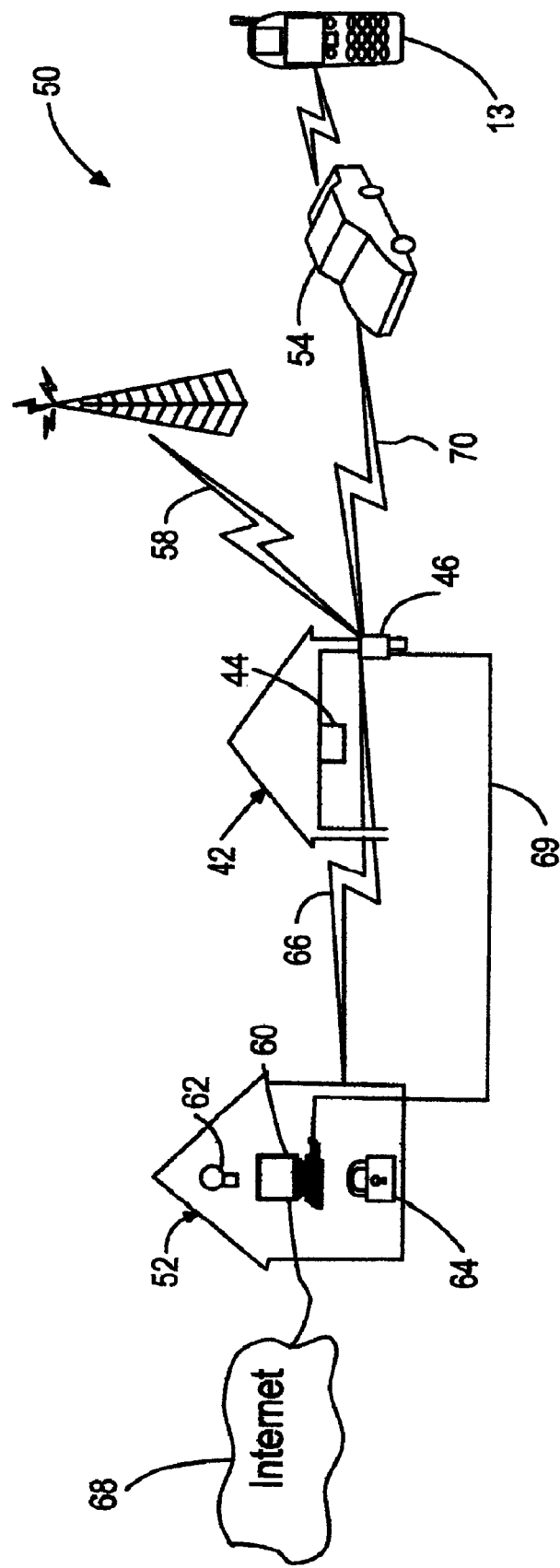
FIG. 3 illustrates a block diagram of a system having the GDO communications gateway module in the garage of the house for enabling communications between a vehicle, house devices, and telecommunications networks in accordance with an embodiment of the present invention.

Referring now to FIG. 1, a block diagram of a hands-free telephone system 10 for a vehicle in accordance with an embodiment of the present invention is shown. Telephone system 10 enables a user of the vehicle to have a phone conversation while using both hands for driving the vehicle.

Telephone system 10 includes an appliance 12 integrated into the vehicle. Appliance 12 includes a Bluetooth enabled communications module 16. Communications module 16 wirelessly communicates with Bluetooth enabled devices such as a cell phone 13 in the vehicle. As such, telephone system 10 is a Bluetooth enabled device of the vehicle. During a call between a user using cell phone 13 and another party over a telecommunications network, communications module 16 receives the voice signals from the user via a microphone 20 of appliance 12 and wirelessly communicates the voice signals to cell phone 13 for transmission over the network for receipt by the other party. Likewise, during the call, communications module 16 wirelessly receives the voice signals from the other party via cell phone 13 and outputs the voice signals of the other party through vehicle speakers 32 for the user to hear. Communications module 16 can communicate with any Bluetooth enabled device in the vicinity of the vehicle including such devices external to the vehicle.

A controller 14 of appliance 12 controls the overall operation of the appliance. Appliance 12 includes a voice recognition module (VRM) 18 which enables the user to use voice commands for answering and making cell phone calls and re-dialing numbers using cell phone 13. VRU 18 is connected to microphone 20 to receive voice commands from the user. VRU 18 translates the voice commands into corresponding signals for use by controller 14. For example, VRU 18 translates the voice command "dial" into a corresponding command signal; translates numeric characters spoken by the user into corresponding signals; etc. VRU 18 is connected to a button 22 to receive manual commands from the user. For example, the user presses button 22 when the user desires appliance 12 to go into a mode for enabling the user to make a call using cell phone 13.

Memory 24 of appliance 12 stores information in a phonebook which may also be stored in a phonebook of cell phone 13. Such information includes a listing of names and associated telephone numbers. A display module 26 of appliance 12 is connected to a vehicle display such as a radio display 28 of the vehicle via vehicle electrical bus 34 for displaying information to the user. A voice synthesizer 30 of appliance 12 generates electronic voice signals in response to corresponding signals generated by controller 14 during operation of telephone system 10. Voice synthesizer 30 is connected to vehicle speaker 32 via bus 34. Voice synthesizer 30 outputs the electronic voice signals to speaker 32 for the user to hear. For example, an outputted electronic voice signal may be "Dialing John" when cell phone 13 is dialing John's telephone number. A text-to-speech (TTS) module 25 of appliance 12 converts text messages into speech for output by voice synthesizer 30 and for storage in memory 24.

Referring now to FIG. 2, a block diagram of a garage 42 having a garage door opener (GDO) 44 and a GDO communications gateway module 46 in accordance with an embodiment of the present invention is shown. GDO 44 and GDO gateway 46 are mounted separately in garage 42. Garage 42 is part of a house 52 (shown in FIG. 3). GDO 44 actuates a mechanical device to open or close the garage door. GDO gateway 46 controls GDO 44 to actuate the mechanical device to open or close the garage door. GDO gateway 46 controls GDO 44 upon receiving an appropriate garage door signal (i.e., a garage door signal recognized by GDO gateway 46). A garage door signal is appropriate in the sense that GDO gateway 46 is programmed to control GDO 44 upon receipt of the garage door signal while GDO gateway 46 ignores other garage door signals. That is, a garage door signal is appropriate when it contains a code or the like which GDO gateway 46 expects to receive for controlling the garage door. As such, if a garage door signal received by GDO gateway 46 does not contain the expected code, then the GDO gateway ignores the garage door signal. Likewise, if a garage door signal received by GDO gateway 46 contains the expected code, then the GDO gateway controls GDO 44 accordingly. In addition to coding information, or alternatively, the appropriateness of a garage door signal may depend on other factors such as its frequency, modulation, etc.

As will be explained in further detail with reference to FIGS. 3 and 4, GDO 44 and GDO gateway 46 communicate with one another through either a wired and/or wireless connection. As such, upon receiving an appropriate garage door signal, GDO gateway 46 transmits a control signal through either a wired or wireless connection to GDO 44 for the GDO to open or close the garage door. In the case of a wired connection, GDO 44 and GDO gateway 46 are connected by a wire for the GDO gateway to communicate the control signal to the GDO. In the case of a wireless connection, GDO 44 includes a receiver for wirelessly receiving the control signal from GDO gateway 46 and the GDO gateway includes a transmitter for wirelessly transmitting the control signal to the GDO.

As will be explained in further detail with reference to FIGS. 3 and 4, GDO gateway 46 is operable for receiving a garage door signal either wirelessly or through wired connections from multiple sources. Such sources include a portable transmitter, an integrated vehicle transmitter, a telephone, a pager, a computer, etc.

In the case of a portable transmitter, GDO gateway 46 includes a receiver for wirelessly receiving garage door signals from the transmitter. Upon user activation of the transmitter when the transmitter is near garage 42, the transmitter wirelessly transmits the appropriate garage door signal for receipt by the receiver of GDO gateway 46. The transmitter is already programmed to transmit the appropriate garage door signal. Upon receiving the appropriate garage door signal, GDO gateway 46 transmits a control signal to GDO 44 for the GDO to open or close the garage door.

In the case of an integrated vehicle transmitter, GDO gateway 46 includes a receiver for wirelessly receiving garage door signals from the transmitter. Upon user activation of the transmitter when the vehicle is near garage 42, the transmitter wirelessly transmits the appropriate garage door signal for receipt by the receiver of GDO gateway 46. The transmitter has been previously programmed by the user to transmit the appropriate garage door signal. Upon receiving the appropriate garage door signal, GDO gateway 46 transmits a control signal to GDO 44 for the GDO to open or close the garage door.

In the case of a telephone, GDO gateway 46 includes a telephone receiver connected to the PSTN. Upon a user calling the telephone receiver from a telephone connected to the PTSN and entering an identification (ID) code or the like, GDO gateway 46 transmits a control signal to GDO 44 for the GDO to open or close the garage door. In this case, GDO gateway 46 is programmed to treat the reception of a telephone call containing the ID code as being the same as receiving the appropriate garage door signal.

In the case of a pager, GDO gateway 46 includes a pager receiver connected to a paging telecommunications network. Upon a user using a pager connected to the paging telecommunications network to communicate an ID code or the like to the pager receiver, GDO gateway 46 transmits a control signal to GDO 44 for the GDO to open or close the garage door. In this case, GDO gateway 46 is programmed to treat the reception of a page containing the ID code as being the same as receiving the appropriate garage door signal.

In the case of a computer, GDO gateway 46 includes a computer receiver hardwired or wirelessly connected directly to the computer or indirectly connected to the computer via a telecommunications network such as the Internet. Upon a user using the computer to communicate an ID code or the like to the computer receiver, GDO gateway 46 transmits a control signal to GDO 44 for the GDO to open or close the garage door. In this case, GDO gateway 46 is programmed to treat the reception of communication from the computer containing the ID code as being the same as receiving the appropriate garage door signal.

In addition to GDO gateway 46 enabling communications from various sources to control the garage door, the GDO gateway enables communications between the sources themselves. That is, in general, GDO gateway 46 enables communications between vehicles, house devices, and telecommunications networks. For instance, GDO gateway 46 enables a user to communicate with the house devices from a vehicle, a telephone, a computer connected to the Internet, etc. The user may communicate with the house devices via GDO gateway 46 in order to control the house devices. Such house devices are devices of house 52 in which garage 42 belongs and include a personal computer (PC), a security system, a lighting system, stereo equipment, HVAC system, house door locks, etc. Likewise, GDO gateway 46 enables a user to communicate with a vehicle parked in garage 42 from the house devices, a telephone, a computer connected to the Internet, etc. The user may communicate with the vehicle via GDO gateway 46 in order to transfer information into or from the vehicle.

Referring now to FIG. 3, with continual reference to FIGS. 1 and 2, a block diagram of a system 50 having GDO communications gateway module 46 in garage 42 of house 52 for enabling communications between vehicle 54, devices 56 of house 52, and telecommunications networks in accordance with an embodiment of the present invention is shown. In this embodiment, the telecommunications networks include a pager network 58 and the Internet 68. As shown in FIG. 3, GDO gateway 46 functions as a central communication point for such communications.

With respect to house device 56 and the Internet 68, GDO gateway 46 and house devices 56 are operable for communicating with one another wirelessly or through wired connections. For instance, GDO gateway 46 and house devices 56 use WiFi, Bluetooth, or other RF communications technologies for communicating with one another over a wireless communication path 66. House devices 56 include a PC 60, a lighting system 62, and a security system 64. In an embodiment, GDO gateway 46 communicates with PC 60, lighting system 62, and security system 64 wirelessly via path 66. For instance, GDO gateway 46 communicates with lighting system 62 to control the operation of the lighting system in accordance with a command of a user. Similarly, GDO gateway 46 communicates with security system 64 to control the operation of the security system in accordance with a command of the user. In an embodiment, PC 60 communicates with lighting system 62 and security system 64 and transfers control signals from GDO gateway 46 to these systems in order to control their operation. As such, in this embodiment, GDO gateway 46 may only need to communicate directly with PC 60. In an embodiment, GDO gateway 46 and PC 60 are connected together by a wired communication path 69 (e.g., Ethernet) for bi-directional communications. PC 60 is also connected to the Internet 68. As a result, GDO gateway 46 has communications access to the Internet 68 via PC 60. Likewise, other computers and devices connected to the Internet 68 have communications access to GDO gateway 46 via PC 60.

With respect to vehicle 54, GDO gateway 46 and vehicle 54 are operable for communicating with one another wirelessly over communications path 70. For instance, as explained above, an integrated vehicle transceiver of vehicle 54 transmits garage door signals using RF technologies over path 70 for receipt by GDO gateway 46 to control the garage door. GDO gateway 46 and Bluetooth enabled appliance 12 of vehicle 54 wirelessly communicate with one another over path 70. To this end, GDO gateway 46 includes a Bluetooth enabled communications module for communicating with communications module 16 of appliance 12. Such communications can take place when vehicle 54 is located near the vicinity of garage 42. This criteria is satisfied when vehicle 54 is parked within garage 42 and is thereby located near GDO gateway 46.

With respect to pager network 58, GDO gateway 46 is operable for receiving paging signals via pager network 58 to control the operation of the garage door as explained above. For instance, a user pages GDO gateway 46 to open the garage door while the user is away from house 52 in order to enable a third party access to garage 42 and/or to the house. Similarly, as explained above, GDO gateway 46 is operable for receiving telephone signals over a telephone network to control the operation of the garage door. Such paging signals and telephone signals include a code or the like understood by GDO gateway 46 as the appropriate garage door signal. Such signals may include other codes or the like which are understood by GDO gateway 46 for controlling anyone of PC 60, lighting system 62, and security system 64. For instance, a code may be representative of information to lock security system 64. As such, in response to receiving such a code in a paging signal or a telephone signal from a user, GDO gateway 46 communicates with PC 60 and/or security system 64 to control the security system.

In general, GDO gateway 46 enables communications between vehicle 54 and house devices 56 by acting as a communications gateway between appliance 12 of vehicle 54 and house devices 56. Communications between GDO gateway 46 and appliance 12 take place over path 70 wirelessly using Bluetooth or other RF communications technologies. Communications between GDO gateway 46 and house devices 56 take place over path 66 wirelessly using WiFi, Bluetooth, or other RF communications technologies and/or over path 69 using wired communications. As such, vehicle 54 may communicate with house devices 56 over path 70 and at least one of paths 66, 69 via GDO gateway 46. Similarly, PC 60 may communicate with vehicle 54 over at least one of paths 66, 69 and path 70 via GDO gateway 46.

PC 60 and appliance 12 may communicate with one another via GDO gateway 46 for a host of reasons. For instance, PC 60 may communicate with appliance 12 via GDO gateway 46 to download stored information such as telephone numbers, contact information, etc., into memory 24 of appliance 12 for use in making cell phone calls. In turn, this information stored in memory 24 may be wirelessly communicated from communications module 16 to cell phone 13 for storage in the cell phone memory. As another example, PC 60 may communicate with appliance 12 via GDO gateway 46 to download navigation information such as maps into memory 24 of appliance 12. Such maps may be operational with a GPS in vehicle 54 to provide hands-free navigation services to the user. Such maps may be displayed on display devices within vehicle 54 for the user to access.

PC 60 is connected to the Internet 68 to access the Internet as is typically done with computers. As such, PC 60 may communicate with appliance 12 via GDO gateway 46 to wirelessly transmit information obtained from the Internet 68 to the appliance. For example, PC 60 may communicate with appliance 12 to download music files, video files, and the like obtained from the Internet 68 into memory 24 of appliance 12. The user may then operate appliance 12 to play the music files stored in memory 24 over speakers 32. Likewise, the user may operate appliance 12 to play the video files stored in memory 24 over a display device. When transferring any information between PC 60 and appliance 12 using GDO gateway 46, memory of the GDO gateway may act as a buffer to facilitate the communications.

Likewise, appliance 12 may communicate with PC 60 via GDO gateway 46 for a host of reasons. For instance, appliance 12 may communicate vehicle diagnostic information to PC 60 via GDO gateway 46. Vehicle diagnostics may include information regarding engine conditions, brake and tire wear, VIN, mileage, oil change maintenance, etc. Such vehicle diagnostic information may be accessed from bus 34. In turn, PC 60 may analyze the vehicle diagnostic information to determine whether any vehicle service is required or suggested. If so, PC 60 may provide an appropriate indication to the user when the user is operating the computer. Further, as PC 60 is connected to the Internet 68, PC 60 may automatically transmit such vehicle diagnostic information to a vehicle service dealer via the Internet. In response, the dealer may advise the user to bring vehicle 54 in for service and the dealer will already have the diagnostic information of the vehicle. Further, the dealer may communicate updated vehicle software pertaining to any of the components of the vehicle to computer 60 via the Internet 68. In turn, PC 60 transfers the updated software to appliance 12 via GDO gateway 46. Appliance 12 may then use bus 34 to transfer the updated software to the appropriate vehicle component.

Appliance 12 may communicate with the Internet 68 via GDO gateway 46 and PC 60 to enable the user to access the Internet from vehicle 54 while the vehicle is located in the vicinity of garage 42. In this case, Internet pages downloaded to appliance 12 from the Internet 68 via GDO gateway 46 and PC 60 may be displayed on a display device in vehicle 54 while the user is accessing the Internet. Appliance 12 may also wirelessly communicate such Internet pages to cell phone 13 for display on the cell phone. As an example of information accessed from the Internet 68, appliance 12 may download customizable horn tunes, turn signal noises, etc., from the Internet via GDO gateway 46 and PC 60. Using this downloaded information, the vehicle's horn may then honk using a customizable horn tune and the vehicle speakers may emit a customized sound for the user to hear each time the vehicle turn signals go on and off. Both the vehicle's horn and the vehicle's turn signal speakers are connected to bus 34.

Appliance 12 may also communicate with lighting system 62 via GDO gateway 46 while vehicle 54 is located in the vicinity of garage 42. For example, the user may use appliance 12 to communicate with lighting system 62 via GDO gateway 46 to turn on lights in house 52 while the user is in the vehicle and is ready to pull the vehicle out of garage 42. Likewise, the user may use appliance 12 to communicate with security system 64 via GDO gateway 46 to turn on the security system after the user in vehicle 54 has just pulled out from garage 42.

If vehicle 54 is out of the vicinity garage 42, the user may use cell phone 13 to make a cell phone call with PC 60 via the Internet 68 to establish communications with GDO gateway 46. For instance, the user may indicate to PC 60 that the lights of house 52 need to be turned on. In this instance, PC 60 conveys this information to GDO gateway 46 which in turn controls lighting system 62 accordingly. Similarly, the user may use cell phone 13 to make a cell phone call with PC 60 via the Internet 68 to advise the PC that security system 64 needs to be turned on. In this instance, PC 60 conveys this information to GDO gateway 46 which in turn controls the security system accordingly.

In addition to making a cell phone call to PC 60 regarding the control of either lighting system 62 or security system 64, the user may make the call to the PC to inquire about the status of either of these systems. In response, PC 60 conveys the monitoring request to GDO gateway 46 which in turn communicates with lighting system 62 and security system 64 regarding same. GDO gateway 46 then communicates the monitoring information to PC 60 which in turn communicates this information to cell phone 13 via the Internet 68 for the user to hear and/or view.

Referring now to FIG. 4, with continual reference to FIGS. 1, 2, and 3, a block diagram of GDO communications gateway module 46 in accordance with an embodiment of the present invention is shown. GDO gateway 46 includes a controller 82 which controls the overall operation of GDO gateway 46. GDO gateway 46 includes memory 84 for use in the operation of GDO gateway 46 including buffering.

In order to wirelessly communicate with house devices 56 over wireless path 66 using WiFi/WiMax communications technologies, GDO gateway 46 includes a wireless transceiver 86. Wireless transceiver 86 may directly connect with Internet 68 if wireless Internet access is available to GDO gateway 46. Wireless transceiver 86 may employ 802.11 communications technology. In order to wirelessly communicate with house devices 56 over wireless path 66 using other RF technologies, GDO gateway 46 includes a RF transceiver 88. In order to wirelessly communicate with house devices 56 over wireless path 66 using Bluetooth communications, GDO gateway 46 includes a Bluetooth enabled communications transceiver 90. In order to communicate with PC 60 over wired path 69, GDO gateway 46 includes an Ethernet transceiver 92.

As indicated above, GDO gateway 46 enables communications between any of house devices 56 and appliance 12 of vehicle 54. For example, PC 60 and appliance 12 may wirelessly communicate with one another by using GDO gateway 46 as a wireless communications gateway. To this end, PC 60 communicates with either of transceivers 86 or 92 of GDO gateway 46; and appliance 12 communicates with transceiver 90 of GDO gateway 46 over wireless path 70. As such, PC 60 and appliance 12 communicate with one another via either of transceivers 86 or 92 and transceiver 90 of GDO gateway 46. Thus, GDO gateway 46 acts as a communications gateway between PC 60 and appliance 12.

GDO gateway 46 may include a wired connection 94 to GDO 44 for transferring control signals to the GDO to open or close the garage door. GDO gateway 46 may include a RF transmitter 96 for wirelessly transferring control signals to GDO 44 to open or close the garage door. In this case, GDO 44 includes a receiver for wirelessly receiving the signals from RF transmitter 96 of GDO gateway 46. GDO gateway 46 includes a receiver 98 for wirelessly receiving the garage door signals from the vehicle transceiver or from a portable transmitter.

GDO gateway 46 may include a telephone receiver 100 connected to the PTSN for receiving telephone calls from the user. Such telephone calls include a code or the like for opening or closing the garage door and/or include other codes or the like for controlling lighting system 62 and/or security system 64. Upon receiving such a telephone call, GDO gateway 46 controls GDO 44, lighting system 62, and/or security system 64 accordingly.

GDO gateway 46 may include a pager receiver 102 wirelessly connected to a paging tower for receiving pages from the user. Such pages include a code or the like for opening or closing the garage door and/or include other codes or the like for controlling lighting system 62 and/or security system 64. Upon receiving such a page, GDO gateway 46 controls GDO 44, lighting system 62, and/or security system 64 accordingly.

GDO gateway 46 may include a satellite transmitter 104. Satellite transmitter 104 may be used for communicating with cell phone 13 of vehicle 54 using satellite phone call technology and/or may be used for accessing the Internet 68.

Thus, it is apparent that there has been provided, in accordance with the present invention, a GDO communications gateway module for a garage of a house in which the module enables communications among vehicles, house devices, and telecommunications networks that fully satisfies the objects, aims, and advantages set forth above. While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A garage door opener communications gateway module comprising:
   a garage door receiver for receiving garage door signals;
   a garage door transmitter for transmitting control signals to a garage door opener operable for opening and closing a garage door of a garage of a house, wherein the garage door transmitter transmits a control signal to the garage door opener to control the garage door upon receipt of a garage door signal by the garage door receiver;
   a first transceiver, the first transceiver being Bluetooth enabled for wirelessly communicating with a Bluetooth enabled appliance of a vehicle over a first communications path when the vehicle is located within the vicinity of the garage; and
   a second transceiver for communicating with a device of the house over a second communications path;
   wherein the vehicle appliance and the house device communicate with one another over the first and second communications paths via the first and second transceivers;
   wherein the garage door receiver, the garage door transmitter, and the first and second transceivers are contained within a housing mountable to the garage.

2. The module of claim 1 wherein the house device is a personal computer connected to the Internet, wherein:
   the second transceiver communicates with the personal computer to receive information from the Internet and the first transceiver communicates with the vehicle appliance to transfer the information from the Internet to the vehicle appliance.

3. The module of claim 2 wherein:
the vehicle appliance communicates with the personal computer via the first and second transceivers in order to access the Internet from the vehicle.

4. The module of claim 1 wherein the house device is lighting system, wherein:
the first transceiver wirelessly communicates with the vehicle appliance over the first communications path to receive a lighting command for the lighting system from the vehicle appliance, wherein the second transceiver transmits the lighting command over the second communications path to the lighting system to control the operation of the lighting system in accordance with the lighting command.

5. The module of claim 1 wherein the house device is a security system, wherein:
the first transceiver wirelessly communicates with the vehicle appliance over the first communications path to receive a security command for the security system from the vehicle appliance, wherein the second transceiver transmits the security command over the second communications path to the security system to control the operation of the security system in accordance with the security command.

6. The module of claim 1 further comprising:
a paging receiver for wireles sly receiving paging signals from a paging telecommunications network;
wherein the garage door transmitter transmits a control signal to the garage door opener to control the garage door upon receipt by the paging receiver of a paging signal containing information indicative of the garage door signal.

7. The module of claim 6 wherein the house device includes at least one of a lighting system and a security system, wherein:
the second transceiver transmits a control signal to the house device to control the house device upon receipt by the paging receiver of a paging signal containing information indicative of a command for controlling the house device.

8. The module of claim 1 further comprising:
a telephone receiver for receiving telephone signals from the PTSN;
wherein the garage door transmitter transmits a control signal to the garage door opener to control the garage door upon receipt by the telephone receiver of a telephone signal containing information indicative of the garage door signal.

9. The module of claim 8 wherein the house device includes at least one of a lighting system and a security system, wherein:
the second transceiver transmits a control signal to the house device to control the house device upon receipt by the paging receiver of a paging signal containing information indicative of a command for controlling the house device.

10. The module of claim 1 wherein the house device includes a personal computer connected to the Internet, wherein:
the second transceiver and the personal computer communicate with one another over an Ethernet line of the second communications path such that information is transferrable to and from the Internet and the vehicle appliance via the personal computer and the second transceiver.

11. The module of claim 1 wherein:
the second transceiver is WiFi enabled and the second communications path includes a WiFi communications path.

12. The module of claim 1 wherein:
the second transceiver is Bluetooth enabled and the second communications path includes a Bluetooth communications path.

13. The module of claim 1 wherein:
the second transceiver is radio frequency (RF) enabled and the second communications path includes a RF communications path.

14. The module of claim 1 wherein the vehicle appliance includes a hands-free telephone system having a Bluetooth enabled communications module for communicating with a Bluetooth enabled cell phone within the vehicle, wherein:
the house device and the cell phone communicate with one another via the first and second transceivers and the Bluetooth enabled communications module of the vehicle appliance.

15. The module of claim 1 wherein:
the garage door transmitter transmits control signals over a wireless connection to the garage door opener to control the garage door upon receipt of a garage door signal by the garage door receiver.

16. The module of claim 1 wherein:
the garage door transmitter transmits control signals over a wired connection to the garage door opener to control the garage door upon receipt of a garage door signal by the garage door receiver.

17. A garage door opener communications gateway module comprising:
a garage door receiver for receiving garage door signals;
a garage door transmitter for transmitting control signals to a garage door opener operable for opening and closing a garage door of a garage of a house, wherein the garage door transmitter transmits a control signal to the garage door opener to control the garage door upon receipt of a garage door signal by the receiver;
a telecommunications receiver for receiving telecommunications signals from a telecommunications network; and
a transceiver for wirelessly communicating with a device of the house;
wherein the garage door transmitter transmits a control signal to the garage door opener to control the garage door upon receipt by the telecommunications receiver of a telecommunications signal containing information indicative of the garage door signal;
wherein the transceiver wirelessly transmits a control signal to the house device to control the house device upon receipt by the telecommunications receiver of a telecommunications signal containing information indicative of a command for controlling the house device;
wherein the garage door receiver, the garage door transmitter, and the telecommunications receiver are contained within a housing mountable to the garage.

18. The module of claim 17 wherein:
the telecommunications receiver is a paging receiver for receiving paging signals from a pager telecommunications network;
wherein the garage door transmitter transmits a control signal to the garage door opener to control the garage door upon receipt by the paging receiver of a paging signal containing information indicative of the garage door signal.

19. The module of claim 17 wherein:

the telecommunications receiver is a telephone receiver for receiving telephone signals from the PSTN; wherein the garage door transmitter transmits a control signal to the garage door opener to control the garage door upon receipt by the telephone receiver of a telephone signal containing information indicative of the garage door signal.

* * * * *

UNITED STATES PATENT AND TRADEMARK OFFICE
CERTIFICATE OF CORRECTION

PATENT NO. : 7,778,604 B2  Page 1 of 1
APPLICATION NO. : 11/690380
DATED : August 17, 2010
INVENTOR(S) : Jason G. Bauman et al.

It is certified that error appears in the above-identified patent and that said Letters Patent is hereby corrected as shown below:

Column 11, Line 30, Claim 6:

After "receiver for" delete "wireles sly" and insert -- wirelessly --.

Signed and Sealed this

Ninth Day of November, 2010

David J. Kappos
*Director of the United States Patent and Trademark Office*